Patented May 22, 1928.

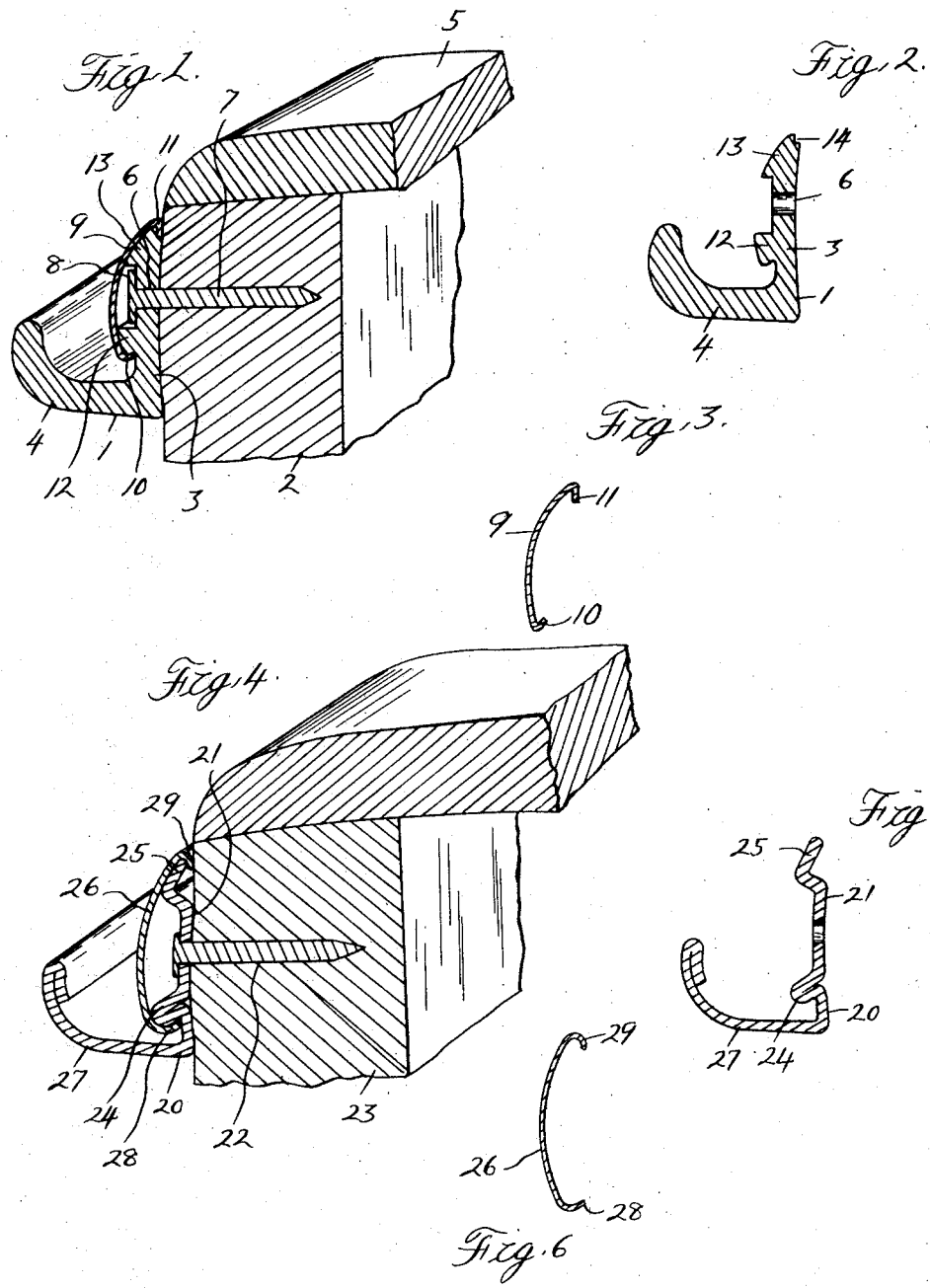

1,670,465

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

DRIP MOLDING FOR VEHICLE BODIES.

Application filed March 9, 1925. Serial No. 14,304.

This invention relates generally to molding constructions and refers more particularly to drip molding constructions designed for use on vehicle bodies.

One of the essential objects of the invention is to provide molding of this type having spaced shoulders to which suitable strips may be attached quickly to conceal the securing means for the molding.

Another object of the invention is to provide a simple form of molding that can be manufactured at a comparatively low cost and that is capable of being easily and quickly attached to the vehicle body.

With the above and other objects in view, the invention consists in certain novel features of construction, combinations and arrangements of parts as will be more fully described and particularly pointed out in the appended claim.

In the accompanying drawing;

Figure 1 is a fragmentary perspective view of a portion of a vehicle body of the closed type with a strip of molding embodying my invention attached thereto.

Figure 2 is a cross sectional view through the drip molding.

Figure 3 is a cross sectional view through the concealing strip.

Figure 4 is a view similar to Figure 1 but showing a slightly modified form of construction.

Figure 5 is a cross sectional view through the molding shown in Figure 4.

Figure 6 is a cross sectional view through the concealing strip shown in Figure 4.

Referring now to the drawing, the numeral 1 designates a strip of molding embodying my invention secured to the top frame 2 of the vehicle body. This molding may be formed of any suitable material and is preferably substantially L-shape in cross section. As shown in Figures 1 to 3 inclusive, the molding 1 is preferably an aluminum casting having the vertical portion 3 secured to the outer edge of the top frame 2, and the trough-shaped portion 4 at the lower edge of the vertical portion 3 for receiving and conveying away water draining off the top deck 5. To facilitate attachment of the molding to the vehicle body, the vertical portion 3 of the molding is preferably provided at spaced points throughout its length with suitable openings 6 for receiving the nails 7 or other securing elements.

To conceal the heads 8 of the nails, I preferably provide a suitable finish strip 9 having marginal flanges 10 and 11 respectively that are preferably pressed over suitable shoulders 12 and 13 respectively of the vertical portion 3 of the molding. As shown, the lower shoulder 12 extends longitudinally of the vertical portion 3 and is spaced from the horizontal portion 4 to permit the flange 10 of the concealing strip to be readily engaged with the lower edge of the shoulder 12. The upper shoulder 13 also extends longitudinally of the vertical portion 3 and is preferably spaced a sufficient distance from the rear face 14 thereof to permit the upper flange 11 of the strip 9 to be positioned between the upper edge of the shoulder 13 and the outer edge of the frame 2. Inasmuch as this flange 11 rests against the frame 2, it will be readily apparent that water draining from the top deck 5 will pass downwardly over the concealing strip 9 into the trough 4 which will convey it to the proper discharge point.

In Figures 4 to 6 inclusive I have shown a slight modification in which the molding 20 is preferably formed of sheet metal. With this construction, the vertical portion of the molding has a substantially flat attaching portion 21 through which the nails 22 or other securing elements are driven into the top frame 23 of the vehicle body, and is also provided with outwardly off-set, longitudinally extending shoulders 24 and 25 respectively which support the concealing strip 26. As shown, the lower shoulder 24 preferably inclines downwardly adjacent to the horizontal portion 27 of the molding and is adapted to be engaged by the lower marginal flange 28 of the concealing strip 26, while the upper shoulder 25 preferably inclines rearwardly adjacent to the outer edge of the top frame 23 and is adapted to be engaged by the upper marginal flange 29 of the strip 26. Thus, the strip 26 may be readily secured to the molding 20 to conceal the nails 22 or other securing elements by merely pressing the flanges 28 and 29 respectively over the edges of the shoulders 24 and 25 respectively of the molding.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

In combination, a strip of drip molding having an upright portion, a horizontal portion projecting laterally from said upright portion at the lower longitudinal edge thereof and cooperating with said upright portion to form a trough, said upright portion being provided adjacent to said horizontal portion with an outwardly projecting return bent portion that inclines downwardly toward said horizontal portion, said upright portion being further provided at its upper longitudinal edge with a longitudinally extending flange of substantially L-shape in cross section that is off-set outwardly with respect to said upright portion, said horizontal portion, upright portion, inclined flange and off-set flange being formed from one piece of sheet metal, and means for directing water into the trough formed by the horizontal and upright portions including a finish strip extending longitudinally of the outer face of said upright portion and provided at its upper and lower edges with inwardly extending open return bent flanges that embrace and conceal the inclined return bent portion and the upper edge of the off-set flange aforesaid.

In testimony whereof I affix my signature.

WILLIAM MARSHALL.